United States Patent
Maslak (10) Patent No.: US 9,742,731 B2
(45) Date of Patent: Aug. 22, 2017

(54) GEOLOCATION VIA INTERNET PROTOCOL

(71) Applicant: Level 3 Communications, LLC, Broomfield, CO (US)

(72) Inventor: Joel C. Maslak, Golden, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 127 days.

(21) Appl. No.: 14/687,461

(22) Filed: Apr. 15, 2015

(65) Prior Publication Data
US 2015/0295888 A1    Oct. 15, 2015

Related U.S. Application Data

(60) Provisional application No. 61/979,831, filed on Apr. 15, 2014.

(51) Int. Cl.
| | |
|---|---|
| G06F 15/16 | (2006.01) |
| H04L 29/12 | (2006.01) |
| H04L 29/06 | (2006.01) |
| H04L 29/08 | (2006.01) |
| H04L 12/46 | (2006.01) |

(52) U.S. Cl.
CPC ........ *H04L 61/609* (2013.01); *H04L 61/1511* (2013.01); *H04L 67/02* (2013.01); *H04L 67/10* (2013.01); *H04L 67/18* (2013.01); *H04L 69/06* (2013.01); *H04L 12/4633* (2013.01); *H04L 61/251* (2013.01); *H04L 61/6059* (2013.01)

(58) Field of Classification Search
CPC ............................ H04L 61/609; H04L 61/1511
USPC .................................................. 709/219, 245
See application file for complete search history.

(56) References Cited

U.S. PATENT DOCUMENTS

| | | |
|---|---|---|
| 6,236,652 B1 | 5/2001 | Preston et al. |
| 2004/0184465 A1 | 9/2004 | Lee et al. |
| 2004/0264465 A1 | 12/2004 | Dunk |
| 2006/0010252 A1 | 1/2006 | Miltonberger et al. |
| 2006/0095585 A1 | 5/2006 | Meijs et al. |
| 2008/0071927 A1 | 3/2008 | Lee |
| 2008/0086574 A1 | 4/2008 | Raciborski et al. |
| 2011/0153723 A1 | 6/2011 | Mutnuru et al. |
| 2011/0289185 A1 | 11/2011 | Heder et al. |

(Continued)

OTHER PUBLICATIONS

International Preliminary Report on Patentability, dated Oct. 18, 2016, Int'l Appl. No. PCT/US15/025949, Int'l Filing Date Apr. 15, 2015; 10 pgs.

(Continued)

*Primary Examiner* — Philip B Tran (57) ABSTRACT

Aspects of the present disclosure involve systems, methods, computer program products, and the like, for extracting information associated with one networking transmission protocol, such as Internet Protocol version 6 (IPv6), based on information associated with a different networking transmission protocol, such as Internet Protocol version 6 (IPv4). More specifically, when resolving an IP address for a Uniform Resource Locator (URL) through which a content file may be obtained, the system may base the resolved URL on attributes of an IPv4 address extracted from an IPv6 address for a machine associated with the request. In one particular example, a geographic location of a requested computing device or machine may be determined or estimated based on an IPv4 address extracted from an IPv6 address associated with the request.

18 Claims, 6 Drawing Sheets

(56) References Cited

U.S. PATENT DOCUMENTS

2012/0321052 A1 12/2012 Morrill et al.
2013/0086631 A1 4/2013 Archer et al.
2013/0191215 A1 7/2013 Metcalf

OTHER PUBLICATIONS

International Search Report, dated Jul. 21, 2015, Int'l Appl. No. PCT/US15/025949, Int'l Filing Dated Apr. 15, 2015; 3 pgs.
Written Opinion of the International Searching Authority, dated Jul. 21, 2015, Int'l Appl. No. PCT/US15/025949, Int'l Filing Dated Apr. 15, 2015; 8 pgs.

GEOLOCATION VIA INTERNET PROTOCOL

CROSS-REFERENCE TO RELATED APPLICATIONS

This application claims priority under 35 U.S.C. §119(e) to U.S. Provisional Application No. 61/979,831 entitled "GEOLOCATION VIA INTERNET PROTOCOL", filed on Apr. 15, 2014 which is incorporated by reference in its entirety herein.

FIELD OF THE DISCLOSURE

Embodiments of the present invention generally relate to systems and methods for implementing a telecommunications network, and more specifically for resolving network addresses from use in determining an estimated geographic location of a requesting computing device.

BACKGROUND

Telecommunication networks provide for the transmission of information across some distance through terrestrial, wireless or satellite communication networks. Such communications may involve voice, data or multimedia information, among others. One particular example of transmission of data or multimedia information involves a content delivery network (CDN). CDNs are increasingly used to distribute content, such as videos, multimedia, images, audio files, documents, software, and other electronic resources, to end users on behalf of one or more content providers. Using a CDN allows the content providers to increase the speed and reliability of content delivery without deploying additional infrastructure. Moreover, a CDN allows for the distribution of the content through one or more existing networks without the need to store the content within the existing networks.

Typically, a CDN includes several content servers from which the content can be supplied to a requesting end user. In one example, these content servers may be accessed through a telecommunications network to which the end user is in communication. The network may include any number of components to facilitate the connection of the end user to the requested content, such as routers, Internet Service Provider networks, other intermediate networks, and the like. In general, the content available from the CDN is stored on one or more edge clusters connected to the CDN or other upstream content providers. Requests for content are then transmitted by the CDN to the edge clusters or content providers to provide the content to the requesting customers. However, the CDN may desire to direct the end user's computing device to a specific content storage device or server.

It is with these observations in mind, among others, that various aspects of the present disclosure were conceived and developed.

SUMMARY

One implementation of the present disclosure may take the form of a method for operating a telecommunications network. The method includes the operations of receiving a request associated with a communication on the telecommunications network, the request comprising an Internet Protocol version 6 (IPv6) address related to a requesting device from which the request was sent, deriving an Internet Protocol version 4 (IPv4) address from the IPv6 address of the request, obtaining an attribute of the IPv4 address from a database, and resolving an IP address of a telecommunications device to service the request based at least on the obtained attribute of the IPv4 address.

Another implementation of the present disclosure may take the form of a resolver server of a telecommunications network. The resolver server includes a network communication port to transmit and receive communications over the telecommunications network, a processor, and a memory device in communication with the processor for storing one or more instructions. When the one or more instructions are executed by the processor the resolver server performs the operations of receiving a request associated with a user of the telecommunications network through the network communication port, the request comprising an Internet Protocol version 6 (IPv6) address related to a requesting device from which the request was sent, deriving an Internet Protocol version 4 (IPv4) address from the IPv6 address of the request, obtaining an attribute of the IPv4 address from a database, and resolving an IP address of an endpoint device of the telecommunications network to service the request based at least on the obtained attribute of the IPv4 address.

Yet another implementation of the present disclosure may take the form of a method for operating a database associated with a telecommunications network. The method includes the operations of receiving a plurality of requests associated with a plurality of communications through a network communication port over a period of time, wherein each request of the plurality of requests comprises an Internet Protocol version 6 (IPv6) address related to a requesting device from which each request was sent, deriving an Internet Protocol version 4 (IPv4) address for each of the IPv6 addresses of the plurality of requests after the period of time, storing the IPv4 address for each of the plurality of requests in a database, and assigning at least one attribute to each of the IPv4 addresses stored in the database.

DETAILED DESCRIPTION

Aspects of the present disclosure involve systems, methods, computer program products, and the like, for extracting information associated with one networking transmission protocol, such as Internet Protocol version 6 (IPv6), based on information associated with a different networking transmission protocol, such as Internet Protocol version 6 (IPv4). More specifically, when resolving an Internet Protocol (IP) address for a Uniform Resource Locator (URL) through which a content file may be obtained or a user of a network may be connected to an end device of the network, the system may base the resolved URL on attributes of an IPv4 address extracted from an IPv6 address for a machine associated with the request. In one particular example, a geographic location of a requested computing device or machine may be determined or estimated based on an IPv4 address extracted from an IPv6 address associated with the request. The IPv4 address may be extracted, decoded, or otherwise obtained from the IPV6 address, and the IPv4 address is used to obtain some attribute, such as a geographic location, of the IPV4 address. An IP address is then resolved, where the IP address of the device to service the request is based, at least in part, on the attribute of the IPV4 address.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

Figure 1:
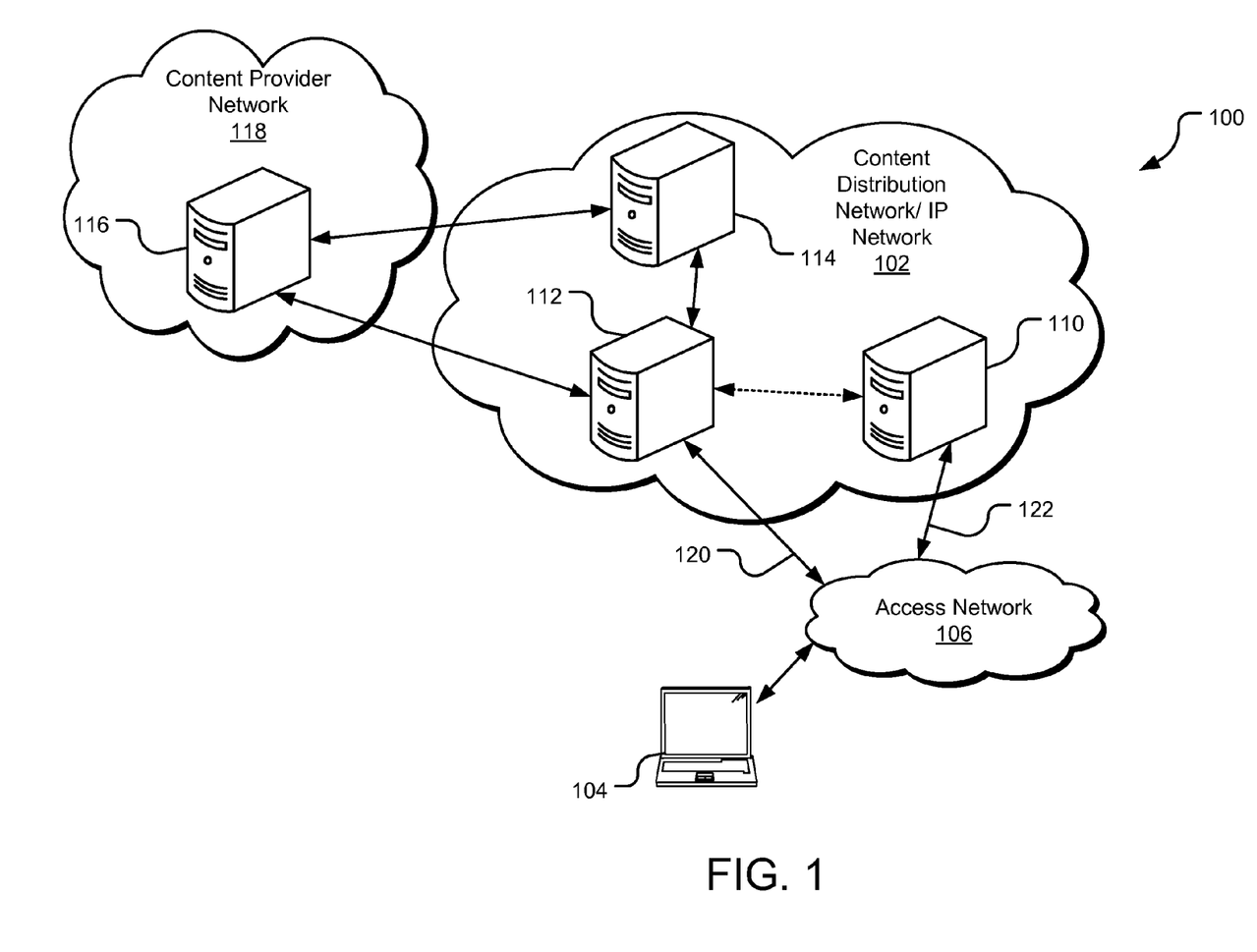
FIG. 1 is an example network environment for distributing content over a telecommunications network.

FIG. 1 is an example network environment 100 for distributing content to one or more users that may be aided by identifying a geographic location of a requesting device. Although illustrated in FIG. 1 as a content delivery network, it should be appreciated that aspects of the present disclosure may apply to any type of telecommunications network that utilizes IP addresses for connecting an end user to one or more components of the network. For example, aspects of the disclosure may be utilized to connect a user of the network to an endpoint in the network, a conferencing server, a virtual private network device, and the like. Thus, as the CDN architecture is used throughout the document as the example network architecture through which aspects of the present disclosure may be applied, other network architectures and configurations are similarly contemplated.

In one implementation of the network environment 100, a CDN 102 is communicably coupled to one or more access networks 106. In general, the CDN 102 comprises one or more components configured to provide content to a user upon a request and an underlying IP network through which the request is received and the content is provided. The underlying IP network associated with the CDN servers may be of the form of any type IP-based communication network configured to transmit and receive communications through the network and may include any number and types of telecommunications components. In this manner, CDN-based components may be added to an existing IP-based communication network such that the components receive a request for content, retrieve the content from a storage device, and provide the content to the requesting device through the supporting IP network. For simplicity, the use of the term "CDN" throughout this disclosure refers to the combination of the one or more content servers and the underlying IP network for processing and transmitting communications, unless otherwise noted.

In one embodiment, a user device 104 connects to the CDN 102 through one or more access networks 106 to request and receive content or content files from the CDN. The access network 106 may be under the control of or operated/maintained by one or more entities, such as, for example, one or more Internet Service Providers (ISPs) that provide access to the CDN 102. Thus, for example, the access network 106 may provide Internet access to a user device 104. In addition, the access network 106 may include several connections to the IP network of the CDN 102. For example, access network 106 includes access point 120 and access point 122. Also, the user device 104 may be connected to any number of access networks 106 such that access to the CDN 102 may occur through another access network. In general, access to a CDN 102 (or underlying IP network associated with the CDN) may occur through any number of ingress ports to the CDN through any number of access networks.

The CDN 102 is capable of providing content to a user device 104, which is generally any form of computing device, such as a personal computer, mobile device, tablet (e.g., iPad), or the like. Content may include, without limitation, videos, multimedia, images, audio files, text, documents, software, and other electronic resources. The user device 104 is configured to request, receive, process, and present content. In one implementation, the user device 104 includes an Internet browser application with which a link (e.g., a hyperlink) to a content item may be selected or otherwise entered, causing a request to be sent to a directory server 110 in the CDN 102.

The directory server 110 responds to the request by providing a network address (e.g., an IP address) where the content associated with the selected link can be obtained. In one implementation, the directory server 110 provides a domain name system (DNS) service, which resolves an alphanumeric domain name to an IP address. The directory server 110 resolves the link name (e.g., URL or other identifier) to an associated network address from which the user device 104 can retrieve the content. The operation of the directory server 110 and access network 106 to resolve requests for content from the user device 104 is discussed in more detail below with reference to FIG. 2.

In one implementation, the CDN 102 includes an edge server 112, which may cache content from another server to make it available in a more geographically or logically proximate location to the user device 104. The edge server 112 may reduce network loads, optimize utilization of available capacity, lower delivery costs, and/or reduce content download time. The edge server 112 is configured to provide requested content to a requestor, which may be the user device 104 possibly via an intermediate device, for example, in the access network 106. In one implementation, the edge server 112 provides the requested content that is locally stored in cache. In another implementation, the edge server 112 retrieves the requested content from another source, such as a media access server (MAS) (e.g., a content distribution server 114 or a content origin server 116 of a content provider network 118). The content is then served to the user device 104 in response to the requests.

Figure 2:
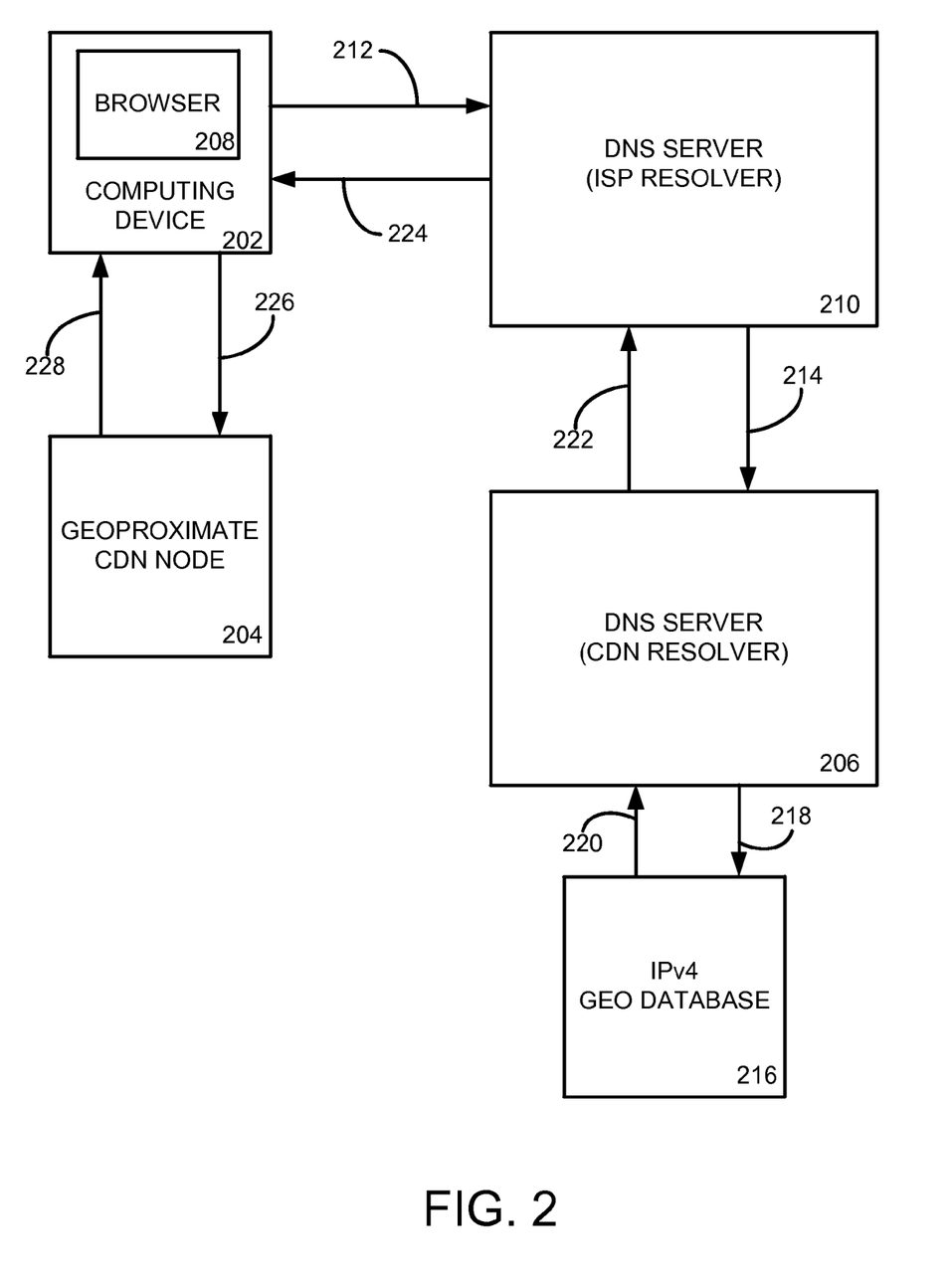
FIG. 2 is an example network environment 200 for providing content to a user of a network through the resolving of an IP address associated with the request for content.

FIG. 2 is an example network environment 200 for providing content to a user of a CDN through the resolving of an IP address associated with the request for content. The components of the network 200 are similar or the same as components discussed above with reference to the network 100 of FIG. 1. For example, the network environment 200 of FIG. 2 includes a user computing device 202, a CDN edge server (referred in FIG. 2 as a "Geoproximate CDN Node" 204) configured to provide content to the user computing device, and a DNS server 206, discussed above in relation to the CDN. Other components of the network 200 of FIG. 2 may also be included in the network 100 environment of FIG. 1, if not explicitly shown in FIG. 1. The operation of the network 200 and components of the network of FIG. 2 is discussed below.

As mentioned above, a user of the CDN 200 may request content or a content file from the CDN. In one example, a user of the user computing device 202 enters a link name (e.g., URL or other identifier) into a browser 208 executed on the computing device. The link name is associated with a network address within the CDN 200 at which the content may be obtained and provided to the computing device. For example, the user or the user device may enter a URL such as www.example.com/content into the browser 208 of the computing device 202. Upon entering the URL, the hostname may be extracted by the browser 208 (www.example.com in this particular case) and sends a request (possibly via an operating system running within the computing device 202) to a DNS 210 associated with the user's access network (transmission arrow 212). The DNS associated with the user's access network is known as the ISP resolver 210. In one example, the DNS request 212 transmitted to the ISP resolver 210 from the computing device 202 includes the hostname of the requested content, as well as an IP address associated with the computing device. Further, the IP address of the computing device 202 may be in transmission protocol IPv4 or IPv6. In general, however, the transmission protocol of the DNS request from the computing device 202 may be any protocol known or hereafter developed, and may include information in addition to a hostname or address.

While the ISP resolver 210 is often implemented to cache responses, the ISP resolver often does not have a cached IP address for the requested content within the CDN 200. In such cases, the ISP resolver 210 transmits a second DNS request (transmission arrow 214) to a DNS server 206 of the CDN (referred to in FIG. 2 as the "CDN resolver") to determine an IP address in the CDN 200 at which the content file may be obtained. Similar to the DNS request 212 above, the DNS request 214 to the CDN resolver 206 may include the hostname of the requested content, as well as an IP address associated with the computing device and/or an IP address associated with the ISP resolver 210 of the access network. Further, the IP addresses of the computing device 202 and the ISP resolver 210 may be in transmission protocol IPv4 or IPv6.

Figure 3:
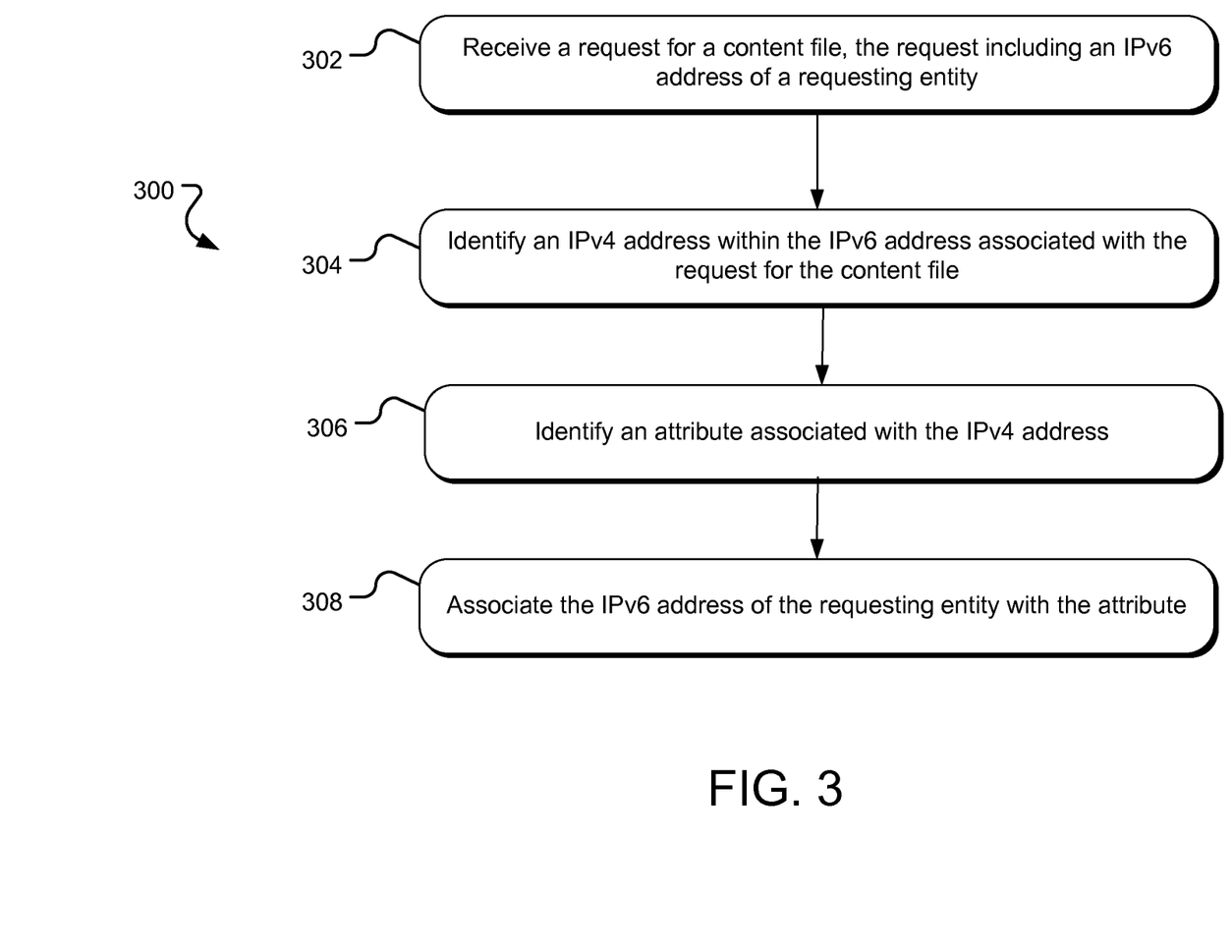
FIG. 3 is a flowchart of a method for a network resolver to obtain an attribute associated with a first type of an IP address from a second type of an IP address.

In the case where the DNS request 216 includes an IPv6 address of the ISP resolver 210 or the computing device 202, the CDN resolver 206 may attempt to determine one or more attributes concerning the request from the IPv6 address. In particular, the CDN resolver 206 may perform one or more of the operations of the method illustrated in FIG. 3. FIG. 3 is a flowchart of a method for a DNS resolver to obtain an attribute associated with an IPv4 address from an IPv6 address. In general, the operations of the method of FIG. 3 are performed by a resolver device of a CDN in response to a request for content file.

Figure 4A:
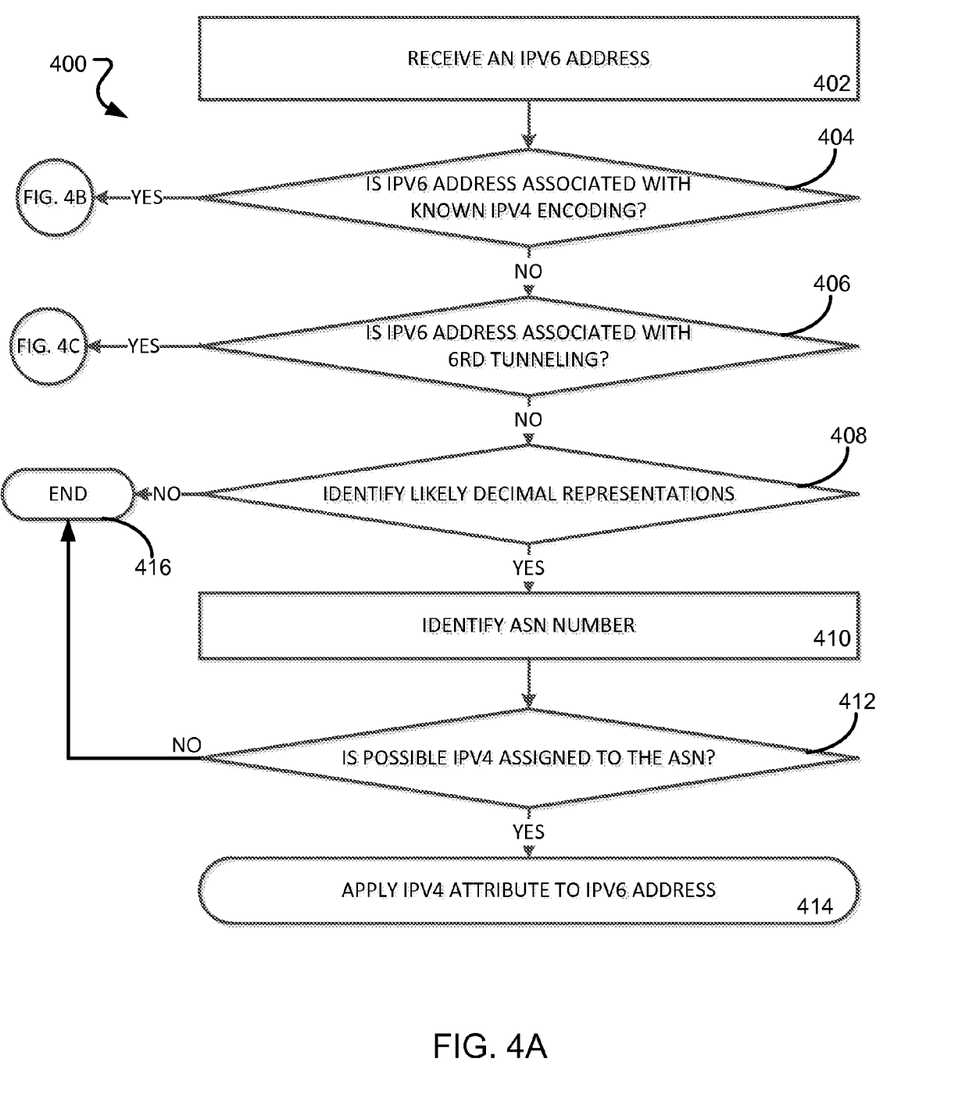
FIGS. 4A-4C illustrate a flowchart of a method for identifying an IPv4 address from an IPv6 address of a DNS request.

Beginning in operation 302, the DNS CDN resolver 206 receives the DNS request 214 from one or more components of the ISP or access network 210. In operation 304, the CDN resolver 206 identifies an IPv4 address from the IPv6 address. The IPv4 address in the IPv6 address of the DNS request 214 may be derived in many ways. For example, the IPv4 address of the DNS request 214 may be embedded within the IPv6 address. In another example, the IPv4 address may be encoded within the IPv6 address. In such an example, the CDN resolver 206 may obtain the encoded IPv4 address from the IPv6 address and decode the IPV4 address. Several ways to obtain an embedded or otherwise related IPv4 from an IPv6 address are described in more detail below with reference to FIGS. 4 and 5.

In general, the obtained IPv4 address is associated with the requesting device that transmits the DNS request 214. For example, many ISP networks are assigned both a range of IPv4 addresses and IPv6 addresses for components, destinations, and customers within the ISP network. To simplify administration within a network, many ISP networks assign IPv6 addresses to components, destinations, and customers that include an embedded IPv4 address within the IPv6 address. This can make the network easier to troubleshoot, as a network transitions from IPv4-only to a combined IPv4 and IPv6 network. However, the ISP network or requesting device 210 may include the IPv4 address in the related IPv6 address in some manner for any reason as determined by the ISP network administrator.

In operation 306, the CDN resolver 206 identifies an attribute associated with the obtained IPv4 address. In one example, a geographic location may be associated with an IPv4 address received at the CDN resolver 206. In one embodiment of the network 200 illustrated in FIG. 2, geographic information associated with IPv4 may be obtained from a IPv4 geographic database 216. This database 216 may be maintained by the network 200 (such as the CDN) or may be obtained from a third party. In another example, the geographic information may be obtained from a third party and stored for later reference by the network 200. To obtain the geographic attribute associated with the IPv4, the CDN resolver 206 may transmit a request 218 for the information from the database 216. In response to the request 218, the database 220 may transmit the requested information 220 to the CDN resolver 206.

Although discussed above and throughout as an estimated geographic location, the attribute associate with the IPv4 address may be any attribute that is useful to the CDN 200 in resolving the DNS request for the content. For example, the attribute may be one or more levels of service, network connection type, device type, or similar type of information for the particular requesting device or network. Similar to above, any attributes associated with an IPv4 address may be obtained from a database of the network or a database of a third party to the network. In general, any attribute associated with the obtained IPv4 address may be utilized by the CDN resolver 206 to resolve the request for content from the CDN 200.

In operation 308, the CDN resolver 206 may associate the attribute of the IPv4 address with the received IPv6 address for future use. For example, the CDN resolver 206 may associate the attribute to the received IPv6 address and store the association in the database 216. Thus, when another DNS request for content is received at the CDN resolver 206 from the same IPv6 address, the attribute is associated with the IPv6 address such that correlation of the attribute with the IPv6 address is determined without the need to derive the IPv4 address from the IPv6 address.

In general, the operations of the method of FIG. 3 may be performed either in an "online" or real-time fashion in response to requests for content, or "offline" using query logs to other stored data to build a database of associations between IPv6 addresses and IPv4 addresses or between IPv6 addresses and the relevant attribute related to the associated IPv4 address. This offline process may generate a database (such as database 216) that is used by the online querying system, allowing for lookups for the attributes without the need to derive the IPv4 address from the received IPv6 address. This database 216 may also be used by systems that themselves do not implement the method 300 of FIG. 3. In addition, a database 216 containing associations between IPv4 and IPv6 addresses may be used in place of operation 304 when extracting the IPv4 address from the IPv6 address.

Returning to the network 200 of FIG. 2, the CDN resolver 206 may resolve the DNS request 214 by determining an IP address of a content node 204 from which the content may be obtained by the requesting device 202. In one embodiment, the IP address of the content node 204 may be resolved based at least on the obtained attribute of the IPv4 address. In one particular example, the attribute may be an estimated geographic location of the computing device 202 or the ISP network through which the computing device communicates the CDN resolver 206. As mentioned above, it is often advantageous to provide content to a computing device 202 from a content node 204 that is geographically near the computing device. Thus, the IP address of the content node 204 returned by the CDN resolver 206 may be for a content node 204 that is geographically close to the computing device 202.

In this manner, the CDN resolver 206 returns an geoproximate IP address 222 for the requested content to the ISP resolver 210. The ISP resolver 210 then forwards the geoproximate IP address for the requested content to the computing device 202 (transmission arrow 224). With this information, the computing device 202 transmits a content request 226 to the geoproximate CDN node 204 and, in response, the content 228 is transmitted to the computing device 202.

As mentioned above, extracting an IPv4 address from an IPv6 address and assigning attributes associated with the IPv4 address to the IPv6 address may be used in any telecommunications network architecture. In one embodiment, aspects of the present disclosure may be utilized to connect a user of the network to other components in the network, such as an endpoint in the network, a conferencing server, a virtual private network device, and the like. For example, a network may utilize a CDN DNS infrastructure to connect an end user of the network the endpoint device. In other words, the DNS of the CDN may be utilized by the network (or a third party network) to resolve the IP address for the endpoint device. In some instances, further, it may be beneficial to connect the user of the network to an endpoint device that is geographically near the user. For example, a client of the network may have a European and a United States based location. The client may include a VPN device in the telecommunications network in both locations, as well as interconnection between the two locations via a private network or tunnel. If a user of the network logs into the internet while located in Europe, the network may attempt to connect the user to the VPN endpoint in Europe rather than the VPN device in the United States. In this scenario, the telecommunications network may attempt to determine a geolocation of the user based on the user's IPv6 address provided. Further, by extracting an IPv4 address from the IPv6 address of the user, the network may identify and connect the user to a device that is geographically near the user.

In another example, the telecommunications may perform some type of geoblocking and/or similar technology. Geoblocking is the method of preventing users in a particular country from accessing content (because of licensing or other requirements). If the user attempting to access the content provides a IPv6 address, the network may attempt to obtain an IPv4 address from the IPv6 address and associate a geolocation with the user to accurately apply geoblocking. Other examples include using the attribute of the IPv4 address from the IPv6 address to select a default language for a user, assist in locating a user for law enforcement or emergency response purposes, and the like.

As shown, assigning an attribute of an IPv4 address to an associated IPv6 address, such as an approximate geographic location of the device from which the IPv6 address is sent, may be utilized by a telecommunications network in many ways to assist the network. Thus, a database of IPv6 addresses and associated attributes may be useful to the network. As also described above, the network may build such a database offline and not necessarily in response to receiving a request for content from a user. Rather, the network may analyze some of all ISP resolvers that have made a request to the network over a certain time period. The network may run a program against the ISP resolvers and extract one or more IPv4 addresses from the IPv6 addresses, where possible. The IPv4 addresses extracted by the network may then be used to populate the database of IPv6 addresses with an associated attribute, such as in building an approximate geographic location database of recognized IPv6 addresses. This information may then be stored in the database and available for one or more devices of the network to obtain an attribute of an IPv6 address for use by the network. By maintaining the database, the network may not need to extract the IPv4 address from the IPv6 address whenever the IPv6 address is received. Further, the database of attributes and IPv6 addresses may be provided to other networks and/or devices for use by those networks in a similar manner as described above with reference to the CDN architecture. In one particular example, the database 216 of the network of FIG. 2 may be populated or updated offline for a subset of IPv6 addresses obtained from one or more DNS resolvers.

Figure 4B:
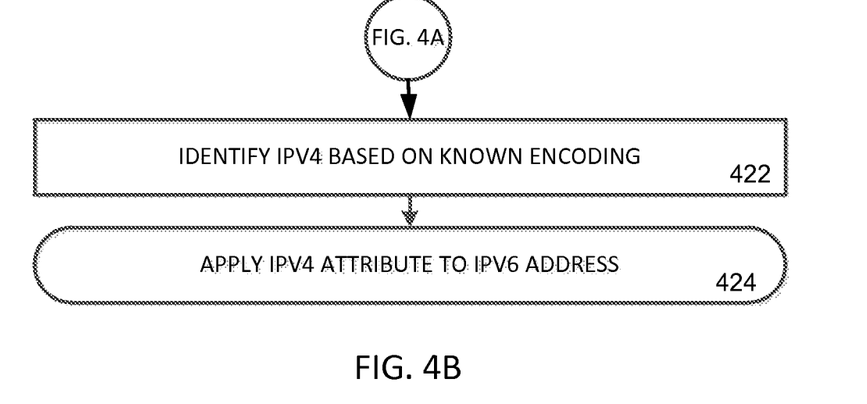
Figure 4C:
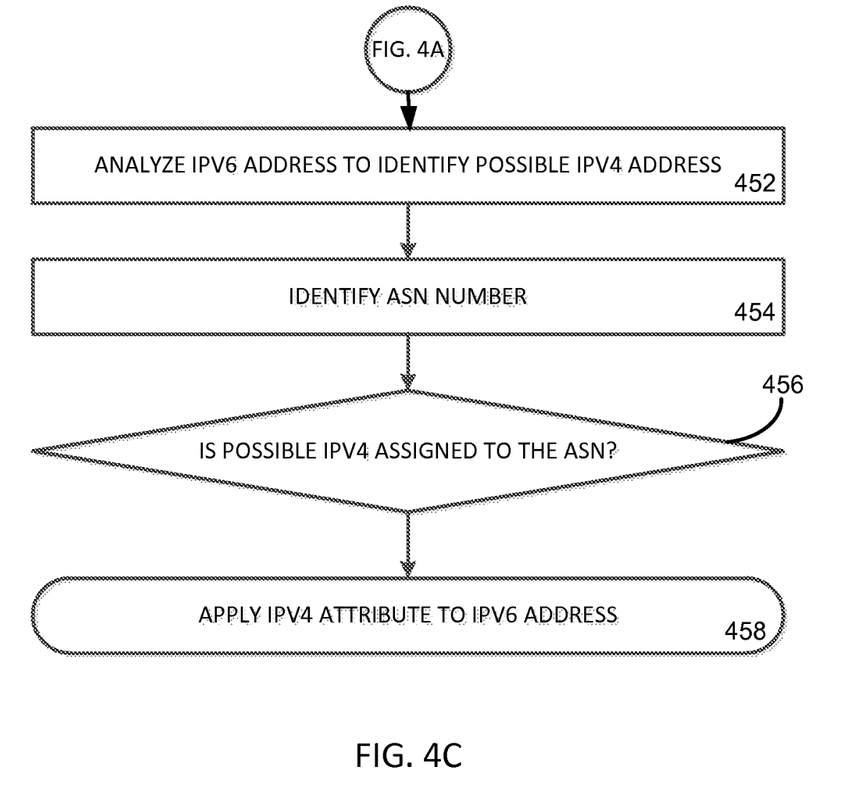

As mentioned above, the DNS request received at the ISP resolver 210 or the CDN resolver 206 may include an IPv6 associated with the requesting device or network. The receiving resolver, however, may not have attributes associated with the received IPv6 address to aid in resolving the request into an optimized IP address for the content providing device. Thus, it may benefit the CDN 200 to obtain an IPv4 address for the requesting device or network to aid in resolving the DNS request. FIGS. 4A-4C illustrate a flowchart of a method for identifying an IPv4 address from an IPv6 address of a DNS request. In one embodiment, the operations of the method of FIGS. 4A-4C may be performed by a resolver associated with a CDN. However, any device within the CDN or access network may perform the operations of FIGS. 4A-4C. In addition, the operations may be performed through the execution of one or more software instructions, through one or more hardware circuits, or through a combination of software and hardware.

Beginning in operation 402, the resolver receives an IPv6 address as part of a DNS request. As mentioned above, the resolver may not have any attributes associated with the IPv6 address, such as an approximate geographical location of the device associated with the IPv6 address. However, the resolver may be able to obtain such attributes for an IPv4 address associated with the device. Further, the IPv4 address may be contained in or otherwise available from the IPv6 address. To obtain the IPv4 address from the IPv6, the resolver may determine if the IPv6 address is associated with a known IPv4 encoding in operation 404. For example, the IPV6 address may include information that through a database look-up or other method, the resolver may identify that the IPV4 address is directly provided as the tail of the IPV6 address, or may be a specific number of bits immediately following the first 4 hexadecimal encodings (first 26 bits) of the IPV6 address. This information may be determined from a previously received IPv6 address from the same network or device that has a similar encoding. For example, an IPv6 address may be received from a particular access network at a first time that includes an IPv4 address encoded or otherwise included in the IPv6 address. The resolver may, once the IPv4 address is identified, determine that all IPv6 addresses from that particular access network include the related IPv4 address in a similar manner. As such, the resolver may store the method by which the IPv4 address is included in the IPv6 address from that particular access network for future reference when an IPv6 address is received from that particular access network. Thus, if the IPv6 address encoding is known, the resolver may perform the operations shown in FIG. 4B. In particular, the resolver identifies the IPv4 address in the IPv6 address based on the known encoding stored in the database in operation 422. With the IPv4 address determined from the IPv6 address, the resolver may apply one or more attributes associated with the IPv4 address to the IPv6 address in operation 424.

In another example, the autonomous system number (ASN) of an access network may be identified for the IPv6 address, and used as lookup in a database of known IPv4 encodings. For example, an ISP associated with a specific ASN, may encode the IPv4 address into an IPv6 address in a known way. The database will include information as to how to decode or otherwise extract the IPV4 address for that ASN. The ASN may also be used to verify a suspected IPv4 address from an IPv6 address, as discussed in more detail below.

If the IPv6 address encoding is not known, the resolver may determine in operation 406 whether the IPv6 address is associated with IPv6 rapid deployment (6RD) tunneling. Generally speaking, 6RD encapsulates an IPv6 packet and uses IPv4 routing for transportation of the IPv6 packets. In many instances, 6RD is used by providers to offer IPv6 services and transportation over an existing IPv4 network and routing infrastructure. In some cases, IPv6 addresses allocated for use by providers using 6RD are indicated as such in the internet "whois" databases. 6RD addresses often include encoded IPv4 addresses.

It is possible for the encoded IPv4 address to be a complete address or a partial address. In the case of the partial address, only the trailing bits may be encoded in the IPv6 address. In the case of partial IPv4 address encoding, the resolver can often determine the IPv4 address in many cases through analysis of the ISP's assigned IPv4 space. If a provider, for example, is encoding the ending 24 bits of a 32 bit IP address, and all IPv4 addresses assigned to the provider (or advertised by the provider using announcement methods such as border gateway protocol (BGP)) include the same leading eight bit string, the resolver may infer the leading bits to obtain the full IPv4 address.

If the resolver determines that the IPv6 address is not associated with 6RD tunneling, the resolver may attempt to identify decimal representations or other encodings within the IPv6 address that may represent an IPv4 address in operation 408. In one embodiment, the four bytes of the IPv6 data following the regional address registry may be an encoded IP address. For example, the IPv6 address may be 1111:11:22:3333:5aff::1. By consulting internet routing tables and internet address registries, the resolver may determine that the ISP was assigned all addresses starting with 1111:11:. While the number of fixed bits in an ISP's address assignment may vary, it is possible to determine the assignment length utilizing internet routing tables and internet address registries. The portion of the IPv6 address following the assignment identifier (in this case 1111:11) may appear to be a hexadecimal encoding of a valid IPv4 address. By converting the portion of the IPv6 following the first four bytes of the address, an associated IPv4 address may be determined. In another embodiment, the last four bytes of the IPv6 address may be an encoded IP address. A similar analysis of the IPv6 address to extract an IPv4 address when encoded in the last four bytes of the IPv6 address is performed to obtain the IPv4 address.

In yet another example, the IPv4 address may be encoded in a decimal format. For example, the received IPv6 address may be 1111:222:3333::c:11:11:11:111. The portion of the IPv6 address identified as 11:11:11:111 appears to be a valid IPv4 address that is encoded as a "decimal" number in the IPv6 address. Thus, similar to above, the decimal representation of the IPv4 is obtained from the IPv6 address. If the resolver is unable to determine a portion of the IPv6 address that is potentially an associated IPv4 address, the process ends 416 and an IPv4 address is not determined or used to associate an attribute to the IPv6 address.

In order to determine whether the extracted information is an IPV4 address and not some other information in the IPV6 address, the extracted IPV4 address is compared to the ASN (autonomous system number) of the IPV6 address to determine if the IPV4 address is assigned to the same ASN or an ASN known to be associated with the same ASN. Such knowledge may be obtained from internet routing advertisements or manual inputs to the system, where one ASN is commonly used in the AS path of another ASN. Generally speaking, an autonomous system is a collection of IP routing prefixes under common control. IPV4 and IPV6 addresses are assigned to specific ASNs. Accordingly, if an extracted number that has the form of an IPV4 address and is part of the same ASN or an administratively related ASN as the IPV6 address from which the number was extracted, then the extracted number may be presumed to be an IPV4 address. The ASN may be determined through a database lookup, BGP information, or otherwise in operation 410. The same verification technique may be used to confirm that an extracted IPV4 address is indeed an IPV4 address. So, for example, in the example above where an ASN is used to lookup known IPV4 encoding techniques, the extracted IPV4 address may be compared to the ASN to confirm that it is likely to be a valid IPV4 address in operation 412. Such confirmation may be useful when it is not known whether an ISP (with a specific ASN) is encapsulating, encoding or otherwise providing IPV4 addresses with each IPV6 address associated with the ASN.

If the resolver determines that the extracted IPv4 address is not associated with the ASN or an administratively related ASN, the process ends 416 and an IPv4 address is not determined or used to associate an attribute to the IPv6 address. Otherwise, if the possible IPv4 address is associated with the ASN or an administratively related ASN, the address is used to identify one or more attributes of the IPV4 address useful in resolving an IP address for the request in operation 414.

A similar set of operations may be performed if the resolver determines that the IPv6 address is associated with 6RD tunneling. In particular, the operations of FIG. 4C may be performed by the resolver when the IPv6 address is associated with 6RD tunneling. In particular, the resolver analyzes the IPv6 address to determine if an IPv4 address is possibly included in the IPv6 address in operation 452. In one example, the resolver analyzes the four bytes of the IPv6 data following the address assignment fixed bits. Also similar to above, the resolver determines an ASN of the IPv6 address in operation 454.

In operation 456, the resolver compares the determined ASN to the possible IPv4 address in the IPv6 address to determine if the ASN is associated with the obtained IPv4 address. If the IPv4 address is associated with the ASN, the resolver associates one or more attributes associated with the IPv4 address to the received IPv6 address in operation 458. In one example, the attribute associated with the IPv6 address and the IPv4 address is an estimated geographic location of the device associated with the IPv6 address.

Generally speaking, an IPV6 address is associated with the origin of a DNS resolver request. The origin of the request may be the device requesting the IP address (e.g., a user at a computer requesting a movie) or may be the ISP resolver for the device requesting the IP address (e.g., an assigned ISP resolver). Embedded or encoded with the IPV6 address is an IPV4 address for the same origin. The resolver or other device obtains some attribute, such as an estimated geographic location, associated with the IPV4 address and uses that attribute (or attributes) to resolve the IP address for the request. In one specific implementation, the resolver returns the IP address for a CDN node geographically based on the origin information. So, for example, in the case where Geo Databases for IPV6 addresses are not well defined but are well defined for IPV4 addresses, the system uses the well-defined IPV4 geographic information in order to identify the origin location for the IPV6 address associated with the origin of the request. In the case of CDN, a user requesting content from a device in Colorado, would be given the address for a content provider device in Colorado able to serve the content rather than for a content provider device in New York, in one simplified example. Without the ability to geolocate, the request might instead be served from New York, which may in turn involve more expense and underperformance as the content would have to traverse more of the network to reach the machine requesting the content.

Figure 5:
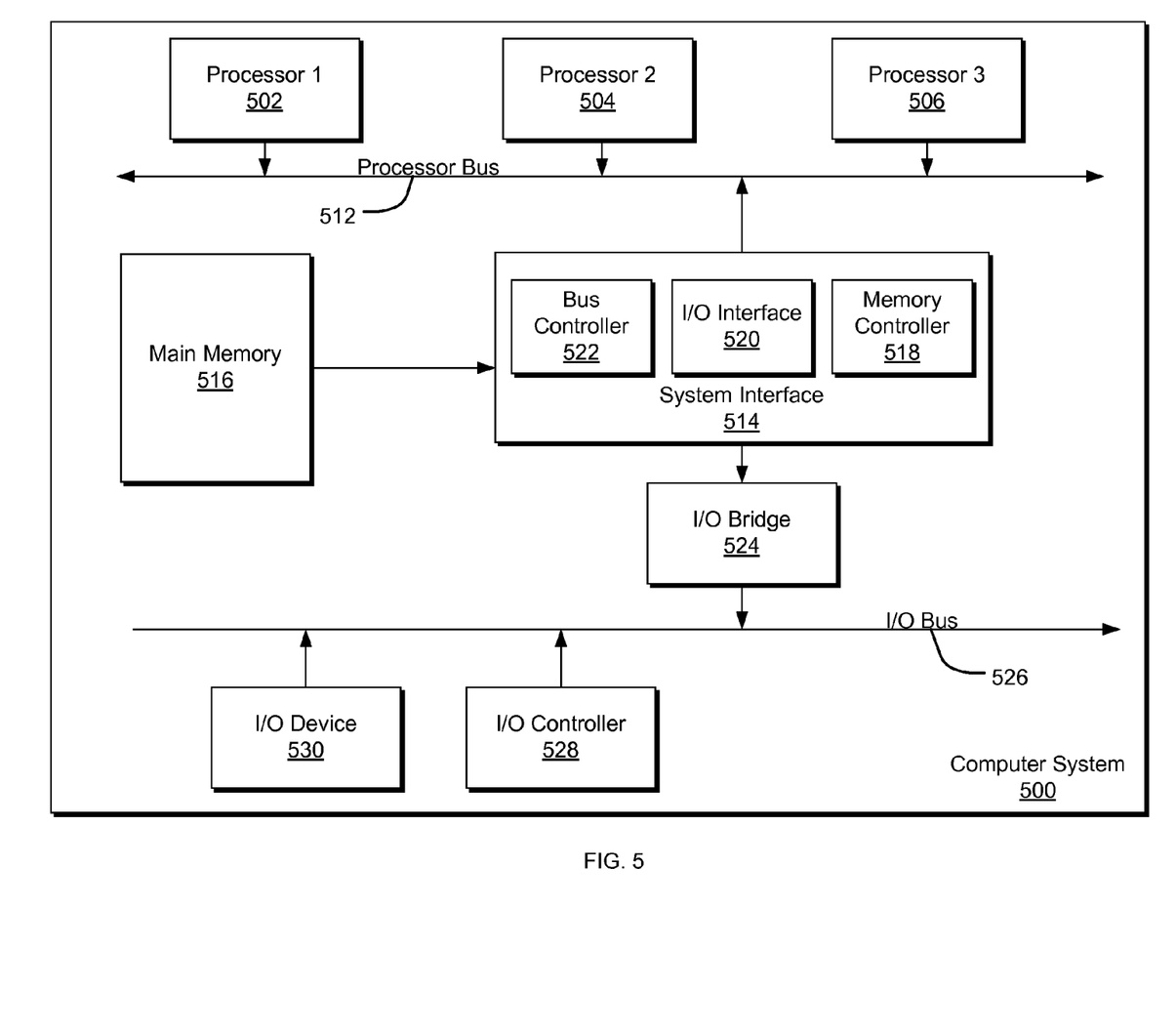
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the CDN or ISP resolver device discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for operating a telecommunications network, the method comprising:
   receiving a request associated with a communication on the telecommunications network, the request comprising an Internet Protocol version 6 (IPv6) address related to a requesting device from which the request was sent;
   deriving an Internet Protocol version 4 (IPv4) address from the IPv6 address of the request;
   obtaining an attribute of the IPv4 address from a database; and
   resolving an IP address of a telecommunications device to service the request based at least on the obtained attribute of the IPv4 address.

2. The method of claim 1 wherein the telecommunications network comprises a content delivery network (CDN) and the request comprises a request for a content file.

3. The method of claim 2 wherein the request associated with the content file is a domain name server (DNS) request transmitted to a DNS resolver of the CDN.

4. The method of claim 1 wherein the attribute of the IPv4 address is an estimated geographic location of the requesting device.

5. The method of claim 4 wherein resolving the IP address of the telecommunications device to service the request comprises selecting the IP address of the telecommunications device based at least on the estimated geographic location of the requesting device.

6. The method of claim 5 wherein deriving the IPv4 address from the IPv6 address of the request further comprises determining an autonomous system number (ASN) included with the IPv6 address and comparing the ASN included with the IPv6 address to an ASN of the derived IPv4 address.

7. The method of claim 1 wherein deriving the IPv4 address from the IPv6 address of the request comprises extracting a hexadecimal encoding of the IPv4 from the IPv6 address.

8. The method of claim 1 wherein deriving the IPv4 address from the IPv6 address of the request comprises extracting a decimal encoding of the IPv4 from the IPv6 address.

9. The method of claim 1 wherein deriving the IPv4 address from the IPv6 address of the request comprises associating the IPv6 address with a database of known IPv6 addresses and extracting the IPv4 address based at least on the database of known IPv6 addresses.

10. A resolver server of a telecommunications network comprising:
    a network communication port to transmit and receive communications over the telecommunications network;
    a processor; and
    a memory device in communication with the processor for storing one or more instructions that, when executed by the processor, cause the resolver server to perform the operations of:
    receiving a request associated with a user of the telecommunications network through the network communication port, the request comprising an Internet Protocol version 6 (IPv6) address related to a requesting device from which the request was sent;
    deriving an Internet Protocol version 4 (IPv4) address from the IPv6 address of the request;
    obtaining an attribute of the IPv4 address from a database; and
    resolving an IP address of an endpoint device of the telecommunications network to service the request based at least on the obtained attribute of the IPv4 address.

11. The resolver server of claim 10 wherein the telecommunications network comprises a content delivery network (CDN) and the request comprises a domain name server (DNS) request transmitted to the resolver server from the requesting device.

12. The resolver server of claim 10 wherein the attribute of the IPv4 address is an estimated geographic location of the requesting device.

13. The resolver server of claim 12 wherein resolving the IP address of the endpoint device to service the request comprises selecting the IP address of the endpoint device based at least on the estimated geographic location of the requesting device.

14. The resolver server of claim 10 wherein deriving the IPv4 address from the IPv6 address of the request comprises extracting a hexadecimal encoding of the IPv4 from the IPv6 address.

15. The resolver server of claim 14 wherein deriving the IPv4 address from the IPv6 address of the request further comprises determining an autonomous system number (ASN) included with the IPv6 address and comparing the ASN included with the IPv6 address to a ASN of the derived IPv4 address.

16. The resolver server of claim 10 wherein deriving the IPv4 address from the IPv6 address of the request comprises extracting a decimal encoding of the IPv4 from the IPv6 address.

17. The resolver server of claim 10 wherein the database storing the attribute of the IPv4 address is provided by a third party to the telecommunications network.

18. The resolver server of claim 10 wherein the database storing the attribute of the IPv4 address is a portion of the telecommunications network.

* * * * *